United States Patent [19]
Rockwell et al.

[11] Patent Number: 5,208,699
[45] Date of Patent: May 4, 1993

[54] COMPENSATED, SBS-FREE OPTICAL BEAM AMPLIFICATION AND DELIVERY APPARATUS AND METHOD

[75] Inventors: David A. Rockwell, Santa Monica; John L. Bartelt, Camarillo, both of Calif.

[73] Assignee: Hughes Aircraft Company, Los Angeles, Calif.

[21] Appl. No.: 811,199

[22] Filed: Dec. 20, 1991

[51] Int. Cl.$^5$ .......................... G01J 1/20; H01S 3/098; B23K 26/02
[52] U.S. Cl. .................................. 359/338; 359/334; 359/341; 385/5; 385/116; 606/15
[58] Field of Search ............... 359/173, 334, 338, 341; 385/5, 116, 122; 606/15, 16

[56] References Cited
U.S. PATENT DOCUMENTS

| | | | |
|---|---|---|---|
| 4,401,364 | 8/1983 | Mochizuki | 359/334 |
| 4,757,268 | 7/1988 | Abrams et al. | |
| 4,812,639 | 3/1989 | Byren et al. | |
| 4,853,528 | 8/1989 | Byren et al. | 359/338 |
| 4,922,481 | 5/1990 | Hicks | 359/338 |
| 4,949,056 | 8/1990 | Akkapeddi | 359/338 |
| 5,038,359 | 8/1991 | Pepper et al. | 372/99 |

FOREIGN PATENT DOCUMENTS

WO89/10018 10/1989 PCT Int'l Appl.

OTHER PUBLICATIONS

"Three-Dimensional Pictorial Transmission in Optical Fibers", *Applied Physics Letters*, vol. 28, No. 2, Jan. 15, 1976, pp. 88–89, Yariv.

"Demonstration of Image Transmission Through Fiber Optical Phase Conjugating", *Optics Letters*, vol. 7, No. 11, Nov. 1982, pp. 558–560, Dunning et al.

"Single-Mode Resonator Incorporating an Internal Multimode Optical Fiber and a Phase-Conjugate Reflector", *Journal of the Optical Society of America B*, vol. 7, No. 7, Jul. 1990, pp. 1216–1220, Luther-Davies et al.

"Stimulated Brillouin Scattering Mirrors Made of Capillary Waveguides", Belan et al, Soviet J. of Quantum Electronics, vol. 17, No. 1, Jan. 87, pp. 122–124.

"Inversion of Wavefront in SMBS of a Depolarized Pump", *JETP Letters*, vol. 28, 1978, pp. 197–201, Basov et al.

"Locked Phase Conjugation for Two-Beam Coupling of Pulse Repetition Rate Solid-State Lasers", *IEEE J. of Quantum Electronics*, vol. 27, No. 1, Jan. 1991, pp. 135–141, Andreev et al.

Alimpier et al; Proc. SPIE, Int. Soc. Opt. Eng., vol. 1278, pp. 65–68, Mar. 15, 1990.

Pepper et al; IEEE Circuits Devices Mag., vol. 7, #5, pp. 21–34, Sep. 1991.

*Primary Examiner*—Nelson Moskowitz
*Attorney, Agent, or Firm*—V. D. Duraiswamy; W. K. Denson-Low

[57] ABSTRACT

An optical beam amplification and delivery system and method employs a central station with a laser oscillator, a laser amplifier and a phase conjugate mirror (PCM). Low power, near diffraction limited laser beams are delivered to each of a plurality of local stations through single-mode polarization preserving fibers. From the local stations the low power beams are transmitted back to the central station through high power multi-mode optical fibers. At the central station the received beams are amplified, phase conjugated and transmitted back through the amplifier and multi-mode fibers to their respective local stations. Distortions imposed upon the beams by the multi-mode fibers during transmission back to the central station, and by the amplifier, are compensated during the return path, providing high power yet near diffraction limited beam quality at the local stations. Attenuation through stimulated Brillouin scattering (SBS) is inhibited by selecting an appropriate aggregate diameter for the multi-mode fibers.

20 Claims, 3 Drawing Sheets

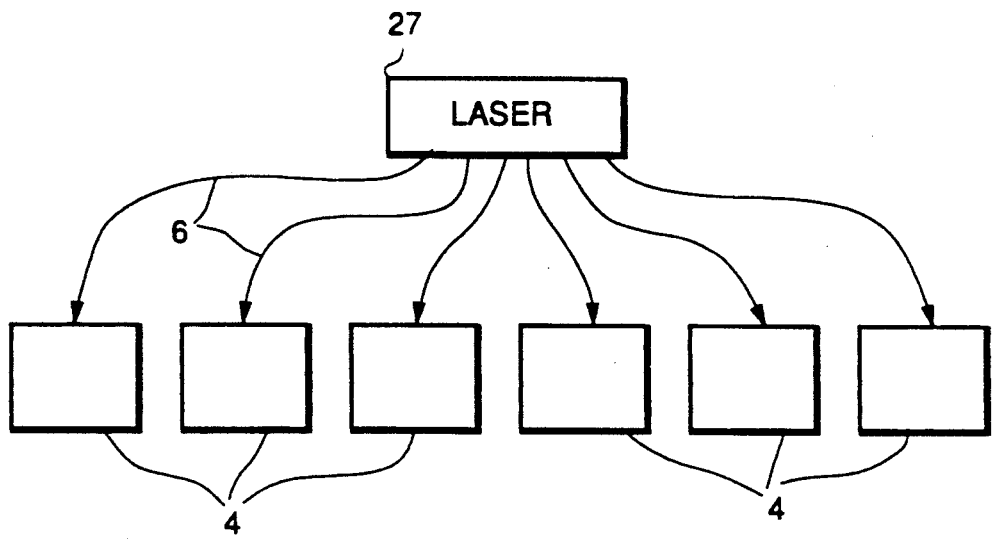
FIG. 1.
FIG. 4.
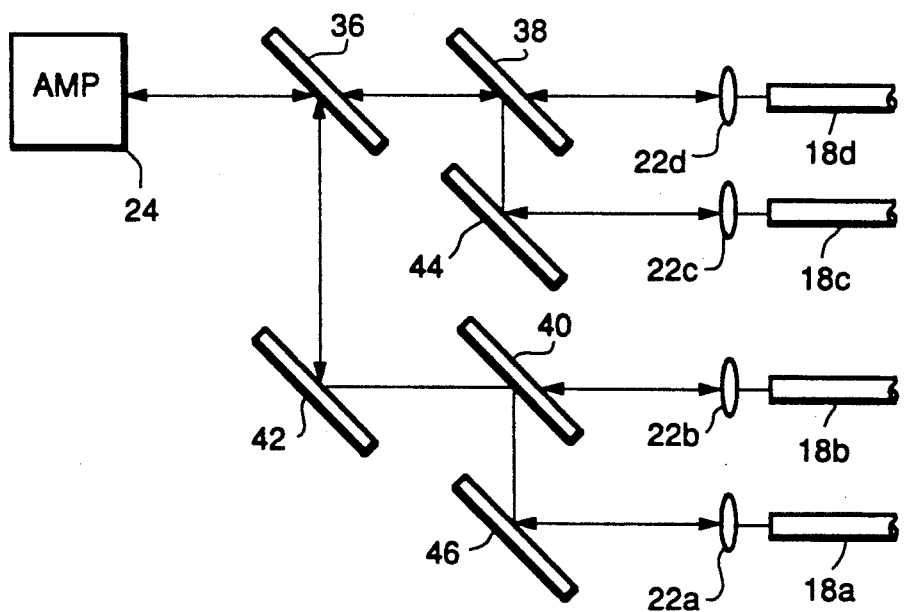

COMPENSATED, SBS-FREE OPTICAL BEAM AMPLIFICATION AND DELIVERY APPARATUS AND METHOD

BACKGROUND OF THE INVENTION

1. Field of the Invention

This invention relates to laser beam amplification and delivery apparatus and methods, and more particularly to the delivery of a high power near diffraction limited optical beam from a central station to one or more remote local stations.

2. Description of the Related Art

There are numerous potential applications for the transmission of high power laser signals from a central station to a number of separate local work stations. For example, a single laser unit could be used to support multiple factory work stations that perform welding and cutting operations. Such an arrangement would enhance overall productivity, since each work station is typically active only about 10%-20% of the time. Also, if multiple systems are multiplexed together, one laser unit can cover for a different laser unit that might be inoperative for maintenance. Another application could be the performance of laser surgery in different operating rooms of a hospital, supplied from a single laser source. One or more optical transmitting apertures integrated into the wing of an aircraft could also be supplied from a single central high power laser source.

To operate most successfully, the beam delivered to each local station should be near diffraction limited, i.e., with maximum collimation and a planar wavefront. Diffraction limited beams can be focused to a small spot or used over a greater working distance than poorer quality beams. For example, they make possible higher welding and cutting rates and a greater degree of application flexibility in the case of factory work stations.

To preserve a diffraction limited beam's quality, a laser beam would normally be transmitted over a single mode optical fiber. However, high power lasers generally require large, multi-mode fibers with core diameters typically on the order of 1 mm. Unfortunately, transmission through a multi-mode fiber progressively distorts the beam and degrades its diffraction limited quality. This has not been a problem with prior fiber optic beam delivery systems, since the high power lasers they employed produced beams that had very poor quality to begin with (typically 100-200 times diffraction limited). Accordingly, any additional deterioration in beam quality resulting from the use of multi-mode fibers was not significant. High power lasers capable of producing beams of much higher quality are presently being developed, however, and with these lasers the loss of beam quality resulting from transmission through multi-mode fibers would be a serious drawback.

The transmission of a high power laser beam can also be limited by attenuation from processes such as stimulated Brillouin scattering (SBS). The presence of SBS has generally not been a problem with previous fiber beam delivery systems, since the high power lasers employed typically operated with broad spectral widths and short coherence lengths (typically on the order of 1 cm). However, for beams produced by some advanced lasers that exhibit narrower bandwidths and longer coherence lengths, SBS can become a limiting factor in the system's power handling capacity. With remote work stations located at distances of 100 m or more from the central laser source, both degradation of beam quality and beam attenuation through SBS can be expected to be encountered.

Together with the supply of multiple local stations from a central laser source, the present invention is concerned with optical phase conjugation. The use of optical phase conjugation to compensate for distortions introduced while transmitting an image through a long multi-mode optical fiber has been known for some time. For example, see Yariv, "Three-Dimensional Pictorial Transmission in Optical Fibers", *Applied Physics Letters*, Vol. 28, No. 2, Jan. 15, 1976, pages 88-89, and Dunning, et al., "Demonstration of Image Transmission Through Fiber Optical Phase Conjugation", *Optics Letters*, Vol. 7, No. 11, November, 1982, pages 558-560. However, the systems described in these references employ phase conjugation apparatus that is remote from the laser source. This approach is incompatible with the desired grouping of the laser source and phase conjugation apparatus at a central station to avoid redundancies among multiple local stations. In Luther-Davies et al., "Single-Mode Resonator Incorporating an Internal Multimode Optical Fiber and a Phase-Conjugate Reflector", *Journal of the Optical Society of America B*, Vol. 7, No. 7, July 1990, pages 1216-1220, an optical fiber incorporated within a phase conjugate resonator is compensated to obtain a diffraction limited output from the fiber. However, this approach suffers from several disadvantages. First, the response time of the Luther-Davies et al. phase-conjugate mirror (PCM), which was based on the photorefractive effect, is relatively slow, and this limits the rate at which the fiber can be moved or flexed. For example, with the device described by Luther-Davies et al. rapid movements of the fiber cause the beam to be extinguished and to re-form after a few seconds. They report that when the fiber was flexed through 90 degrees, continuous operation of their device would only be achieved if the flexing occurred over approximately a five-second period. This represents a severe limitation in most anticipated applications such as robot welding arms, in which a time response on the order of milliseconds is required. Second, operation of their photorefractive PCM requires an auxiliary laser source in addition to the disclosed laser resonator. This requirement adds to the overall cost and complexity of the system. In principle the auxiliary laser could be eliminated by employing any of several self-pumped PCMs that have been reported. However, self-pumped PCMs are limited to reflectivities less than unity, and this low reflectivity can seriously reduce the efficiency of a resonator incorporating such a PCM. Third, for photorefractive PCMs to function it is essential that they absorb some fraction of the incident radiation to generate the charge carriers that lead to the desired photorefractive effect. This absorption is typically ~0.1 percent; although this is a rather low value, it may lead to thermally induced performance degradations in high-power applications. Finally, photorefractive PCMs are not available at all wavelengths of technological interest such as the YAG laser wavelength of approximately one micron, which implies that the concept described by Luther-Davies et al. is only of limited applicability.

Phase conjugation has been used to obtain an amplified output beam from an amplification medium that is optically distorted. For example, in U.S. Pat. No. 4,757,268 to Abrams et al. and assigned to Hughes Aircraft Company, the assignee of the present invention, a low power source beam is transmitted through a plurality of laser gain elements, and then phase conjugated and transmitted back in the opposite direction through the same gain elements. Distortions imposed upon the beam during the initial pass through the gain elements are thus compensated during the reverse pass. While the system produces a high quality optical output, it does not deliver the output to a local station remote from the laser source, phase conjugation and amplification apparatus.

A self-aligning phase conjugate laser system is disclosed in U.S. Pat. No. 4,812,639 to Byren et al., also assigned to Hughes Aircraft Company, in which a laser oscillator is provided at a first location and in one embodiment communicates through an optical fiber with a laser amplifier and phase conjugate mirror at a separate location. For example, the laser oscillator may be incorporated into a surgical instrument that is hand held by a physician. While this system could be used to provide optical amplification and phase conjugate compensation from a central station to a number of remote surgical stations, a separate laser oscillator would be required at each local station. In addition to adding to the cost and complexity of the overall system, this would also increase the weight and bulk of the hand held surgical instrument.

SUMMARY OF THE INVENTION

The present invention seeks to provide a system and method for optical beam amplification and delivery in which the beam is both generated and amplified to a high power level at a central station, and yet is transmitted to one or more local stations with near diffraction limited quality and without diminution by SBS.

To accomplish these goals, a laser oscillator, phase conjugate mirror (PCM) and optical amplifier are provided at a central station. A low power diffraction limited signal is transmitted from the central station to the various local stations, preferably through single-mode, polarization preserving optical fibers. At each local station the received low power diffraction limited beam is coupled into an optical fiber transmission bus that transmits the beam back to the central station for amplification and phase conjugation. The beam is then returned back to the local station from which it originated for use in the work application. The optical fiber transmission bus is preferably implemented as a bundle of one or more multi-mode optical fibers. Each fiber has a cross-sectional area that is sufficient to substantially inhibit SBS by its respective portion of the amplified and phase conjugated beam returned to the local station. While the use of multi-mode fibers distorts the beam during its transit from the local to the central station, and the amplifier further distorts the beam, these distortions are compensated during the return path back to the local station through the phase conjugation process. A high power, near diffraction limited beam can thus be provided in a highly efficient manner to one or more local stations from a single central station.

These and other features and advantages of the invention will be apparent to those skilled in the art from the following detailed description, taken together with the accompanying drawings, in which:

BRIEF DESCRIPTION OF THE DRAWINGS

FIG. 1 is a block diagram of a local station network that can be supplied by a single central station in accordance with the invention;

FIG. 4 is a schematic diagram of a beam division system used for simultaneous sharing of the central station among a plurality of local stations.

DETAILED DESCRIPTION OF THE INVENTION

FIG. 1 indicates in general outline the type of system for which the present invention is intended. A central high power laser source 2 delivers high power, near diffraction limited beams to each of a plurality of local work stations 4 over respective optical transmission lines 6. The work stations may be individual factory cutting and welding systems, laser surgery instruments, distributed aircraft beam transmitters, or in general any application in which multiple high power, near diffraction limited laser beams are required at one or more separate locations remote from the central laser unit 2. To accommodate the high power levels required, the optical transmission fibers 6 over which the high power beams are transmitted are multi-mode. The invention provides a unique way to implement the laser unit 2 and beam delivery fibers 6 so that the near diffraction limited optical quality of the beam at the source laser unit 2 is retained at the local stations 4, despite their transmission through multi-mode fibers.

Figure 2:
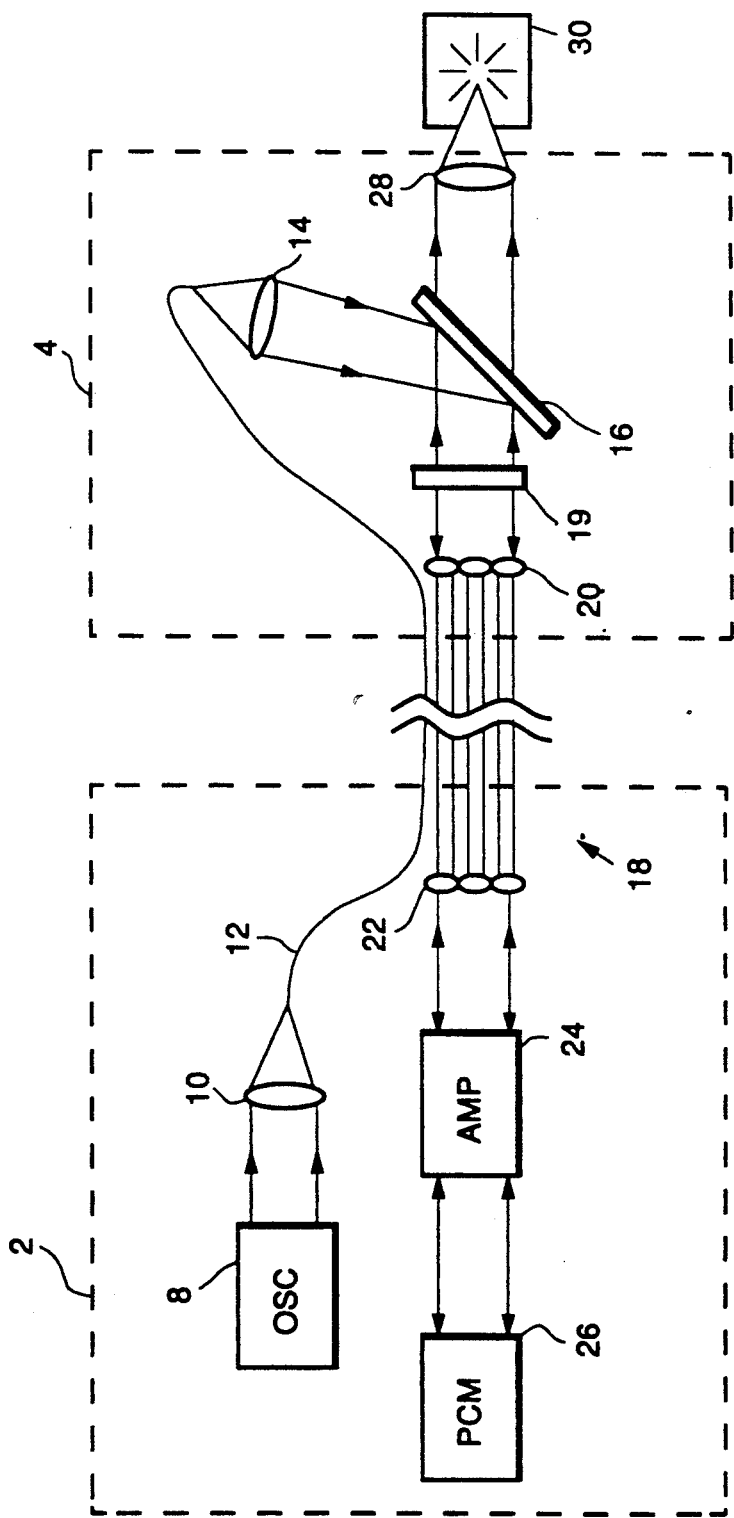
FIG. 2 is a schematic diagram of the invention as applied to a single local station.

A schematic diagram of the preferred embodiment for the invention, showing a single local station 4 supplied from the central laser unit 2, is given in FIG. 2. The output of a relatively low power laser oscillator 8 at the desired local station wavelength is focused by a lens 10 into a single-mode polarization preserving fiber 12 that delivers it to the local work station 4. There the output of the fiber 12 is collimated by a lens 14, and reflected off a polarizing beam splitter 16 that reflects radiation at the incident beam's polarization, while transmitting radiation polarized at 90° thereto. There are various known ways to fabricate a polarization preserving optical fiber.

Since the fiber 12 that transmits the near diffraction limited beam from the laser unit 2 to the local station 4 is single-mode, the beam's near diffraction limited quality is preserved at the work station . After reflection from polarizing beam splitter 16 the beam is directed back to the central laser unit 2 through a multi-mode high power optical fiber bundle 18 consisting of one or more optical fibers. The beam is first transmitted through a non-reciprocal polarization rotator 19, such as a Faraday rotator that rotates its polarization by 45°, and then coupled through lens array 20 into the multi-mode fibers 18.

At the laser unit 2 the outputs of multi-mode fibers 18 are collimated by a lens array 22 and directed into a laser amplifier 24. The amplified output is then processed by a phase conjugate mirror (PCM) 26, from which the beam is returned in a phase conjugated format and transmitted in a second amplification pass through amplifier 24. The twice-amplified beam is then transmitted through multi-mode fiber bundle 18 back to the local station 4, where it is again rotated 45° by non-reciprocal polarization rotator 19. This gives it a total polarization rotation of 90°, compared to the low power beam originally delivered to the local station through single-mode fiber 12. The amplified beam is accordingly transmitted through polarizing beam splitter 16 for use in the work function at the local station. For example, it can be focused by a lens 28 for welding or cutting purposes on a work piece 30. The system would still work if single-mode fiber 12 were not polarization preserving, but half of the beam power would be lost.

The low power, near diffraction limited beam delivered to the local station over single-mode polarization preserving fiber 12 is aberrated by transmission through multimode fibers 18 and also by the amplifier 24. Furthermore, it is generally impractical to equalize the individual fiber lengths of multi-mode fibers 18 to within a fraction of an optical wavelength, and this is another source of distortion. These aberrations are compensated by the PCM 26 so that, during its return path back through amplifier 24 and multi-mode fibers 18, the amplified beam is restored to its near diffraction limited quality. Locating the multi-mode fibers 18 and amplifier 24 within the compensated path of a phase-conjugate laser thus makes it possible to obtain a high power beam at the local station that is near diffraction limited, despite the fact that the laser amplifier 24 and oscillator 8 are both located at the central laser unit 2. If desired a separate laser oscillator 8 could be provided at each local station 4, but this would add to the expense of the overall system and increase the weight of a hand held laser instrument.

While optimally a pure diffraction limited beam would generally be desirable, the invention still offers significant advantages if the final beams delivered to the local stations are only "relatively" diffraction limited. By this it is meant that the beams are substantially more nearly diffraction limited than would be the case if they were generated as high power beams at the central station and simply transmitted in a single pass through the multi-mode fiber bundles 18 to the local stations. Even if the final beams provided with the invention are for example 3, 4 or 10 times diffraction limited, this is a substantial improvement over 100 or 200 times diffraction limited beams that might otherwise result.

The type of PCM 26 employed will generally depend upon the system's power requirements. For continuous wave operation or amplification of a relatively low peak power beam with pulses that extend over relatively long durations, such as 100–200W, 1 ms pulses, a long liquid-filled capillary can be used as disclosed in Belan et al., "Stimulated Brillouin scattering mirrors made of capillary waveguides", *Soviet Journal of Quantum Electronics*, vol. 17, no. 1, January 1987, pages 122–124. For higher peak power but shorter pulse duration applications, such as 10 MW over 10 ns, the PCM can operate by SBS in a bulk medium or in a large area, short length light guide. Suitable PCMs are disclosed in Basov et al, "Inversion of Wavefront in SMBS of a Depolarized Pump", JETP Letters, vol. 28, 1978, page 197–201, and Andreev et al., "Locked Phase Conjugation for Two-Beam Coupling of Pulse Repetition Rate Solid-State Lasers", *IEEE Journal of Quantum Electronics*, vol. 27, no. 1, January 1991, pages 135–141. The two referenced SBS PCMs are also useful in restoring the polarization to the beam, which tends to become depolarized during transmission through the multi-mode fibers 18 and amplifier 24.

The laser oscillator 8 and power amplifier 24 employ either the same type of gain medium, or compatible types having the same wavelength as a result of their gain curves overlapping at least in part. Possible gain media may include a crystal such as ruby or neodymium-doped yttrium aluminum garnet (YAG); a doped glass such as neodymiumdoped glass; a semiconductor such as gallium arsenide; a gas such as carbon dioxide; a liquid containing a fluorescent dye such as rhodamine 6 G; or other gain media known in the art. The gain medium in either case is excited by an appropriate conventional means not shown, such as the light from a xenon flashlamp, a high-voltage electrical discharge, a high-energy electron beam or another laser.

The generation of SBS by the amplified beam returned to the local station 4 through the multi-mode fibers 18 is inhibited by making the aggregate cross-sectional area of the fibers sufficiently large. The SBS threshold is defined by the expression gPL/A, where g is the Brillouin gain of the fiber material, P is the beam power, L is the fiber length and A is the fiber core diameter. SBS will be generated when this expression exceeds a value of about 25–30. Since the present invention can be used for central and local stations that are separated by distances of 100 m or more, the generation of SBS is of serious concern. SBS is inhibited by increasing the diameter of multi-mode fibers 18 to keep the expression below 25. While a single thick multi-mode fiber might be used, very thick optical fibers suffer from poor flexibility; a bundle of multiple smaller diameter fibers is generally preferable. SBS can also be avoided in the single-mode fiber 12 by reducing the power of laser oscillator 8 and correspondingly increasing the power of amplifier 24, and/or by reducing the differential in refractive index between the fiber's core and cladding.

Figure 3:
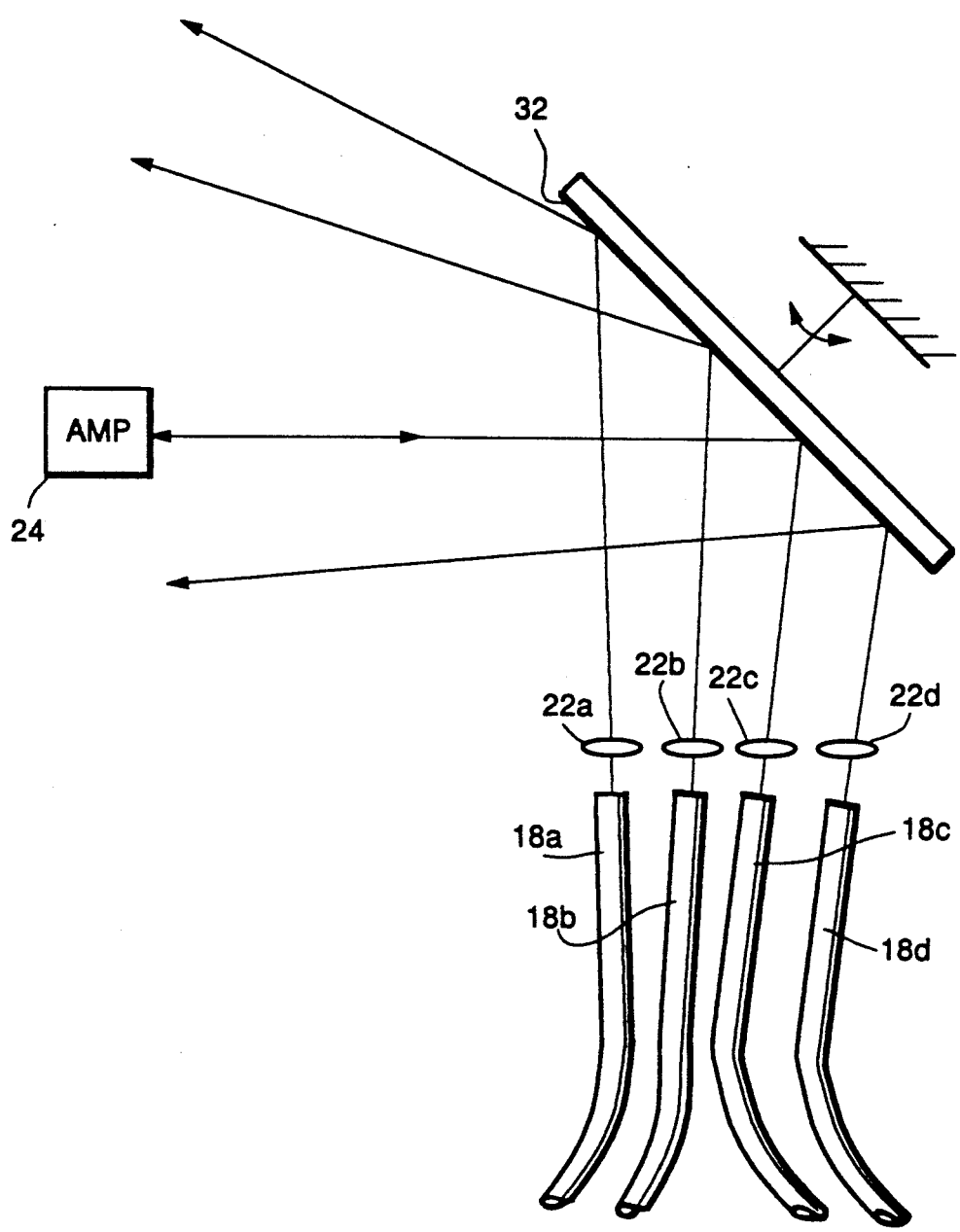
FIG. 3 is a schematic diagram of a switch system used for time-sharing the central station among the local stations.

Various schemes may be used to couple the central station to each of a plurality of separate local stations. A separate single-mode polarization preserving fiber 12 and multi-mode fiber bundle 18 would be provided for each local station. In one example, shown in FIG. 3, the outputs of multi-mode fiber bundles 18a, 18b, 18c and 18d from four separate local stations are collimated by lens arrays 22a, 22b, 22c and 22d, respectively, and then reflected off a rotatable mirror 32 into a laser amplifier 24. The outputs of the various multi-mode fiber bundles are non-parallel, so that the beam from only one fiber bundle at a time is directed into the amplifier 24. The low power beams from the multi-mode fiber bundles that are not coupled into the amplifier at any given time are either diverted off of mirror 32 or their local stations are synchronized with the central station so that a low power beam is transmitted through any particular fiber bundle only when that bundle is coupled with the amplifier 24. A similar scheme, which could employ a different portion of the same rotatable mirror 32, is used to couple the output from the oscillator 8 into respective single-mode polarization preserving fibers 12 for the different local stations.

After phase conjugation and reamplification the beams follow the reverse path back to their respective local stations. The mirror 32 is rotated so that each of the multimode fiber bundles 18a, 18b, 18c and 18d is optically coupled with the amplifier 24 on a time-shared basis.

Another distribution scheme, in which the multi-mode fibers 18a, 18b, 18c and 18d are coupled with the laser amplifier 24 simultaneously rather than on a time-shared basis, is illustrated in FIG. 4, again for the example of four fiber bundles. Non-reciprocal beam splitters 36, 38 and 40, together with mirrors 42, 44 and 46, are positioned between the amplifier 24 and the multi-mode fiber bundles 18a–18d to combine the fiber outputs into a single beam transmitted into the amplifier 24, and then to divide the amplified beam into four separate beams that are directed into respective multi-mode fiber bundles. If different laser powers are desired at the different local stations, the beam splitters can be made disproportionate so as to transmit more optical power to some of the fiber bundles and less to others. A similar beam division would be provided for the single-mode polarization preserving fibers 12. Various combinations of the embodiments of FIGS. 3 and 4 can also be envisioned.

The invention is thus capable of providing high power laser beams from a single central station to a variety of separate local stations with a near diffraction limited quality. More optical elements are located at the central station to minimize equipment redundancy, and high power beams are delivered to each of the local stations without attenuation by SBS. While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical beam amplification and delivery system, comprising:
   a central station having a phase conjugate mirror (PCM) and an optical amplifier coupled together for amplification and phase conjugation of an input optical signal,
   a local station,
   means for generating a source optical signal,
   a first optical fiber for providing said source optical signal to said local station,
   optical fiber means for operatively connecting said central and local stations, and
      coupling means at said local station for coupling said source optical signal from said first optical fiber into said optical fiber means for amplification and phase conjugation at said central station and return along said optical fiber means to said local station, and for decoupling the returned optical signal from said optical fiber means for use at the local station, said PCM rendering said returned optical signal more nearly diffraction limited than an originally diffraction limited optical signal of the same power that is transmitted in a single pass through said optical fiber means,
      said optical fiber means having a cross-sectional area sufficient to substantially inhibit stimulated Brillouin scattering (SBS) by said return optical signal.

2. The system of claim 1, wherein said means for generating a source optical signal comprises a diffraction limited optical signal source at said central station.

3. The system of claim 2, wherein said first optical fiber is single-mode with respect to said diffraction limited optical signal.

4. The system of claim 1, wherein said means for generating a source optical signal comprises a laser oscillator at said local station.

5. The system of claim 1, wherein said optical fiber means is multi-mode with respect to said source optical signal.

6. The system of claim 1, said optical fiber means comprising at least one optical fiber dividing said optical signals, the cross-sectional area of each of said at least one optical fiber being sufficient to substantially inhibit SBS by its respective portion of said return signal.

7. The system of claim 1, said PCM comprising a self-pumped SBS PCM.

8. The system of claim 1, further comprising at least one additional local station similar to said first local station, each local station having associated therewith a separate single-mode fiber for providing said source optical signal to said local station, and optical fiber means for operatively connecting said central station and said respective local station.

9. The system of claim 1, said coupling means including a polarizing beam splitter for polarizing said source optical signal, directing said polarized signal into said optical fiber means and decoupling a return signal with a predetermined polarization for use at the local station, and further comprising a non-reciprocal polarization rotation means in the optical path between said polarizing beam splitter and said PCM and optical amplifier for rotating the polarization of an optical signal received from and returned to said polarizing beam splitter to said predetermined polarization.

10. The system of claim 9, wherein said means for generating a source optical signal comprises a diffraction limited optical signal source at said central station, and said first optical fiber comprises a polarization preserving optical fiber that is single mode with respect to said diffraction limited optical signal for transmitting said signal to said local station.

11. A method of providing an amplified relatively diffraction limited optical signal for use at a first local station, comprising:
   generating a relatively diffraction limited optical signal,
   transmitting said relatively diffraction limited optical signal to said local station through a first optical fiber,
   transmitting said relatively diffraction limited optical signal from said local station to a central station through an optical fiber means,
   aberrating said relatively diffraction limited optical signal during said transmission through said optical fiber means,
   phase conjugating and amplifying said transmitted signal at said central station,
   returning said phase conjugated and amplified signal to said local station through said optical fiber means so that said aberrations are substantially compensated during said return, and
   selecting said optical fiber means to substantially inhibit stimulated Brillouin scattering (SBS) during said return to the local station.

12. The method of claim 11, wherein said relatively diffraction limited signal is generated at said central station and transmitted to said local station.

13. The method of claim 12, wherein said first optical fiber is selected to be single-mode with respect to said relatively diffraction limited signal.

14. The method of claim 13, wherein said optical fiber means is selected to be multi-mode with respect to said relatively diffraction limited signal.

15. The method of claim 12, wherein said relatively diffraction limited signal is transmitted to at least one additional local station that is similar to said first local station, and said local stations are provided with optical amplification by said central station in a fashion similar to said first local station.

16. The method of claim 11, wherein said relatively diffraction limited signal is generated at said local station.

17. The system of claim 1, wherein said first optical fiber is single-mode with respect to said diffraction limited optical signal.

18. The system of claim 8, further comprising:
lens arrays for collimating the outputs of the optical fiber means associated with each local station, and
a rotatable mirror for reflecting said collimated outputs to said central station for amplification, said mirror being rotatable so that respective optical fiber means are optically coupled with the amplifier on a time shared basis.

19. The system of claim 18, wherein a portion of said rotatable mirror couples the output from the means for generating a source optical signal into the respective single-mode fiber of each local station.

20. The system of claim 8, further comprising non-reciprocal beam splitter and mirrors for combining the outputs from the optical fiber means of each local station into a single beam for amplification, and for dividing the returned amplified and phase conjugated beam into separate beams that are directed into the respective optical fiber means of each local station.

* * * * *